US012187162B2

(12) United States Patent
Delrieu et al.

(10) Patent No.: US 12,187,162 B2
(45) Date of Patent: Jan. 7, 2025

(54) ELECTRIC VEHICLE PROPULSION SYSTEM AND PROPULSION SYSTEM OPERATING METHOD

(71) Applicant: Dana Heavy Vehicle Systems Group, LLC, Maumee, OH (US)

(72) Inventors: Frederic Delrieu, Montreal (CA); Alexander Lebel, Laval (CA); Tyler Stiene, Hamilton (CA); Brian Wong, Laval (CA)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 333 days.

(21) Appl. No.: 17/660,732

(22) Filed: Apr. 26, 2022

(65) Prior Publication Data

US 2022/0348113 A1 Nov. 3, 2022

Related U.S. Application Data

(60) Provisional application No. 63/181,090, filed on Apr. 28, 2021.

(51) Int. Cl.
*B60L 58/33* (2019.01)
*B60K 1/04* (2019.01)
(Continued)

(52) U.S. Cl.
CPC ............... *B60L 58/33* (2019.02); *B60K 1/04* (2013.01); *B60K 11/06* (2013.01); *B60L 1/003* (2013.01);
(Continued)

(58) Field of Classification Search
CPC ......... H01M 8/04302; H01M 8/04303; H01M 8/0432; H01M 8/04626; H01M 8/04955;
(Continued)

(56) References Cited

U.S. PATENT DOCUMENTS 4,931,947 A  6/1990 Werth et al.
6,331,365 B1 * 12/2001 King ...................... B60L 50/51
                                          320/126
(Continued)

FOREIGN PATENT DOCUMENTS

DE   102019008255 A1   6/2020
EP       2581249 A1   4/2013
JP     2003257441 A   9/2003

*Primary Examiner* — Gertrude Arthur Jeanglaude
(74) *Attorney, Agent, or Firm* — McCoy Russell LLP (57) ABSTRACT

Methods and systems for an electric vehicle (EV) propulsion are provided. A method for operating an EV propulsion system is provided, in one example, that includes, while a traction battery assembly generates electric power, initiating start-up of a hydrogen fuel cell assembly based on a first battery state of charge (SOC) threshold and a first hydrogen fuel storage threshold to transition into a hybrid mode of operation. In the propulsion system, the traction battery assembly includes one or more traction batteries that are electrically coupled to one or more hydrogen fuel cells in the hydrogen fuel cell assembly via a distribution assembly, where the distribution assembly is electrically coupled to a traction motor.

20 Claims, 5 Drawing Sheets

(51) Int. Cl.
| | |
|---|---|
| *B60K 11/06* | (2006.01) |
| *B60L 1/00* | (2006.01) |
| *B60L 50/75* | (2019.01) |
| *B60L 53/22* | (2019.01) |
| *B60L 58/18* | (2019.01) |
| *B60L 58/26* | (2019.01) |
| *B60L 58/30* | (2019.01) |
| *B60L 58/40* | (2019.01) |
| *B60R 16/023* | (2006.01) |
| *H01M 8/04007* | (2016.01) |
| *H01M 8/04302* | (2016.01) |
| *H01M 8/04303* | (2016.01) |
| *H01M 8/0432* | (2016.01) |
| *H01M 8/04537* | (2016.01) |
| *H01M 8/04955* | (2016.01) |
| *H01M 10/48* | (2006.01) |
| *H01M 10/613* | (2014.01) |
| *H01M 10/625* | (2014.01) |
| *H01M 16/00* | (2006.01) |
| *H01M 50/249* | (2021.01) |
| *B60K 1/00* | (2006.01) |

(52) U.S. Cl.
CPC .............. B60L 50/75 (2019.02); B60L 53/22 (2019.02); B60L 58/18 (2019.02); B60L 58/26 (2019.02); B60L 58/30 (2019.02); B60L 58/40 (2019.02); B60R 16/0238 (2013.01); H01M 8/04007 (2013.01); H01M 8/04302 (2016.02); H01M 8/04303 (2016.02); H01M 8/0432 (2013.01); H01M 8/04626 (2013.01); H01M 8/04955 (2013.01); H01M 10/48 (2013.01); H01M 10/613 (2015.04); H01M 10/625 (2015.04); H01M 16/006 (2013.01); H01M 50/249 (2021.01); *B60K 2001/005* (2013.01); *B60K 2001/0405* (2013.01); *B60K 2001/0494* (2013.01); *B60L 2210/10* (2013.01); *B60L 2240/12* (2013.01); *B60L 2240/36* (2013.01); *B60L 2240/54* (2013.01); *H01M 2220/20* (2013.01); *H01M 2250/20* (2013.01)

(58) Field of Classification Search
CPC ............. H01M 10/48; H01M 2220/20; H01M 2250/20; B60L 58/40; B60L 50/75; B60L 2240/12
See application file for complete search history.

(56) References Cited

U.S. PATENT DOCUMENTS

| | | |
|---|---|---|
| 6,448,535 B1 | 9/2002 | Ap |
| 6,580,977 B2 | 6/2003 | Ding et al. |
| 6,737,822 B2 * | 5/2004 | King .................. B60L 50/51 |
| | | 318/759 |
| 7,252,166 B2 | 8/2007 | Kubusch et al. |
| 7,273,120 B2 | 9/2007 | Tabata |
| 7,434,611 B2 | 10/2008 | Wunderlich et al. |
| 7,543,454 B2 | 6/2009 | Harris |
| 7,810,595 B2 | 10/2010 | Moran et al. |
| 8,027,759 B2 | 9/2011 | Saeki et al. |
| 8,148,952 B2 | 4/2012 | Schaffnit |
| 8,347,645 B1 | 1/2013 | Miller |
| 8,511,407 B2 | 8/2013 | Jeon et al. |
| 8,602,141 B2 | 12/2013 | Yee et al. |
| 8,822,093 B2 | 9/2014 | Kim et al. |
| 9,543,557 B2 * | 1/2017 | Gunther .............. H01M 50/249 |
| 9,895,999 B2 | 2/2018 | Ohashi |
| 10,442,297 B2 | 10/2019 | Brown et al. |
| 10,957,920 B2 | 3/2021 | Sato et al. |
| 2006/0101645 A1 | 3/2006 | Stone |
| 2009/0091299 A1 * | 4/2009 | Lin ...................... G01R 31/367 |
| | | 324/426 |
| 2011/0136026 A1 | 6/2011 | Betts et al. |
| 2020/0185735 A1 | 6/2020 | Kim et al. |
| 2021/0155224 A1 | 5/2021 | McKibben et al. |
| 2021/0179176 A1 | 6/2021 | Kim |

* cited by examiner

ELECTRIC VEHICLE PROPULSION SYSTEM AND PROPULSION SYSTEM OPERATING METHOD

CROSS-REFERENCE TO RELATED APPLICATION

The present application claims priority to U.S. Provisional Application No. 63/181,090, entitled "ELECTRIC POWERTRAIN AND METHOD FOR OPERATION OF SAID POWERTRAIN", and filed on Apr. 28, 2021. The entire contents of the above-listed application are hereby incorporated by reference for all purposes.

FIELD

The present description relates generally to propulsion systems with a battery assembly and a hydrogen fuel cell assembly and a power management method for the propulsion systems.

BACKGROUND AND SUMMARY

Electric powertrains have previous utilized either battery technology or fuel cells to provide electric energy for a traction motor. Both electric vehicle technologies do not generate hydrocarbon emissions during vehicle operation, which may provide an attractive alternative to vehicles with internal combustion engines when taking into account environmental factors during vehicle design.

US 2021/0155224 A1 to McKibben et al. discloses a heavy duty vehicle with a power distribution system that contains a traction battery sub-assembly and a fuel cell range extender, in certain configurations. The traction batteries are positioned on the side of the vehicle in front of the fuel cells and associated cooling system. Further, in McKibben's vehicle, the power distribution unit receives electric energy from the battery sub-assembly and the range extender and in turn provides the power to motors in the wheels of the drive axle.

The inventors have identified several drawbacks with McKibben's heavy duty vehicle as well as other electric vehicles. McKibben lacks a detailed power management strategy for both the traction batteries and fuel cells, which may lead to unwanted and repeated cycling of the fuel cell system through start-up and shutdown. Other prior vehicle propulsion systems that utilize both traction batteries and hydrogen fuel cells have exhibited high frequency fluctuations in the fuel cell's power output, during certain conditions. The high frequency output fluctuations in the fuel cells may lead to premature degradation of the fuel cells and associated componentry, under certain conditions.

The inventors have recognized the abovementioned challenges and developed a method for operating an electric vehicle (EV) propulsion system to at least partially overcome the challenges. The method includes, in one example, while a traction battery assembly generates electric power, initiating start-up of a hydrogen fuel cell assembly based on a first battery state of charge (SOC) threshold and a first hydrogen fuel storage threshold to transition into a hybrid mode of operation. In such an example, the traction battery assembly includes one or more traction batteries that are electrically coupled to one or more hydrogen fuel cells in the hydrogen fuel cell assembly via a distribution assembly. Further in the EV propulsion system, the distribution assembly is electrically coupled to a traction motor. In this way, power generation in both the fuel cell assembly and the traction battery assembly may be efficiently managed to reduce instances of fuel cell shutdown to increase fuel cell and more generally EV longevity. Customer appeal is increased due to expanded lifespan of the EV propulsion system.

Further in one example, the method may further include, in the hybrid mode of operation, operating the hydrogen fuel cell assembly in an idling state, a lower speed maneuvering state, or a driving state based on a current traction motor power generation and multiple propulsion system power ranges corresponding to the idling state, the lower speed maneuvering state, and the driving state. In this example, operating the hydrogen fuel cell assembly in the idling state, the lower speed maneuvering state, or the driving state may include operating a traction battery controller and a propulsion system controller with a distinct set of gains associated with the idling state, the lower speed maneuvering state, or the driving state. In this way, gains for the propulsion system controllers may be altered based on the system's kinematic states in the hybrid operating mode. The gains associated with each state may be selected to maintain the battery at a desired SOC or SOC range and reduce transient behavior of the hydrogen fuel cell assembly to further reduce high frequency fluctuations in the fuel cell's power output. Consequently, the propulsion system's longevity and reliability are further increased.

In yet another example, the method may further include, during a regeneration state, decreasing electric power output of the hydrogen fuel cell assembly. In this way, hydrogen fuel cell power output is managed to increase regenerative braking in the propulsion system. Consequently, the propulsion system's operating efficiency is increased, thereby increasing the EV's range. Customer appeal is even further increased as a result.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An energy management strategy for an electric vehicle (EV) propulsion system is described herein. This strategy allows the propulsion system to transition between a battery mode and a hybrid mode to reduce the number of fuel cell shutdown events as well as attenuate high frequency fuel cell output fluctuations. In the hybrid mode, both a traction battery assembly and fuel cell assembly are generating electric energy while in the battery mode, the fuel cell assembly is shutdown. A threshold hydrogen fuel storage amount and a battery state of charge (SOC) threshold may be used to determine when a modal transition is wanted. The energy management strategy may further include, while the propulsion system is operating in the hybrid mode, transitioning between two of an idling state, a lower speed maneuvering state, and a driving state based on the power output of the propulsion system. Each of these states have different sets of gains that are provided to the system's feedback controllers to maintain the traction battery SOC at a desired percentage or within a desired range as well as reduce the transient behavior of the fuel cells (e.g., reduce high frequency fluctuations of the fuel cell's power output). Consequently, the chance of traction battery and fuel cell degradation is reduced, thereby increasing the system's longevity.

Figure 1:
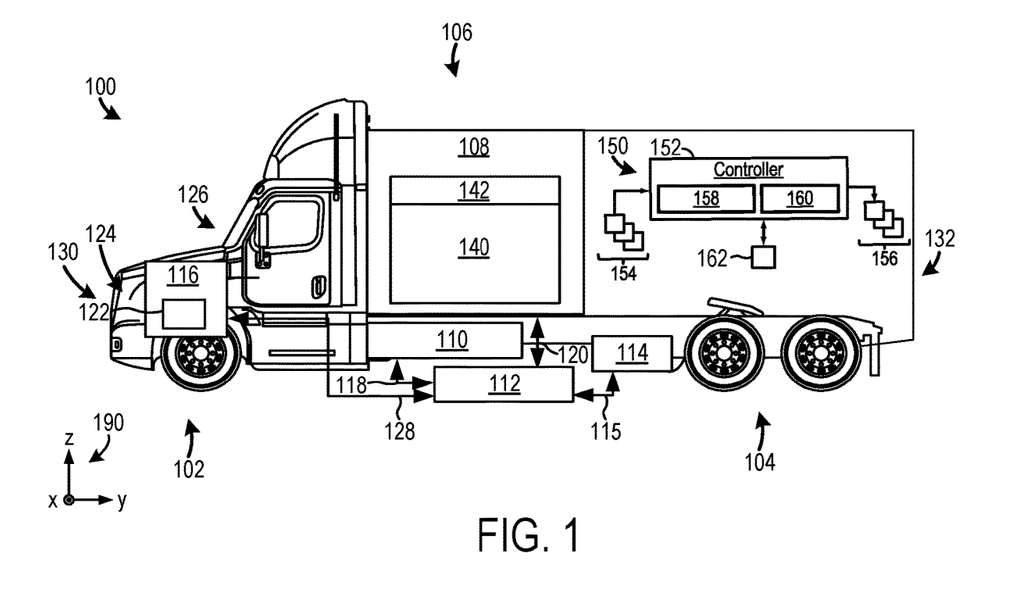
FIG. 1 shows an illustration of an electric vehicle (EV) with modular electric propulsion system components that are schematically depicted.
Figure 2:
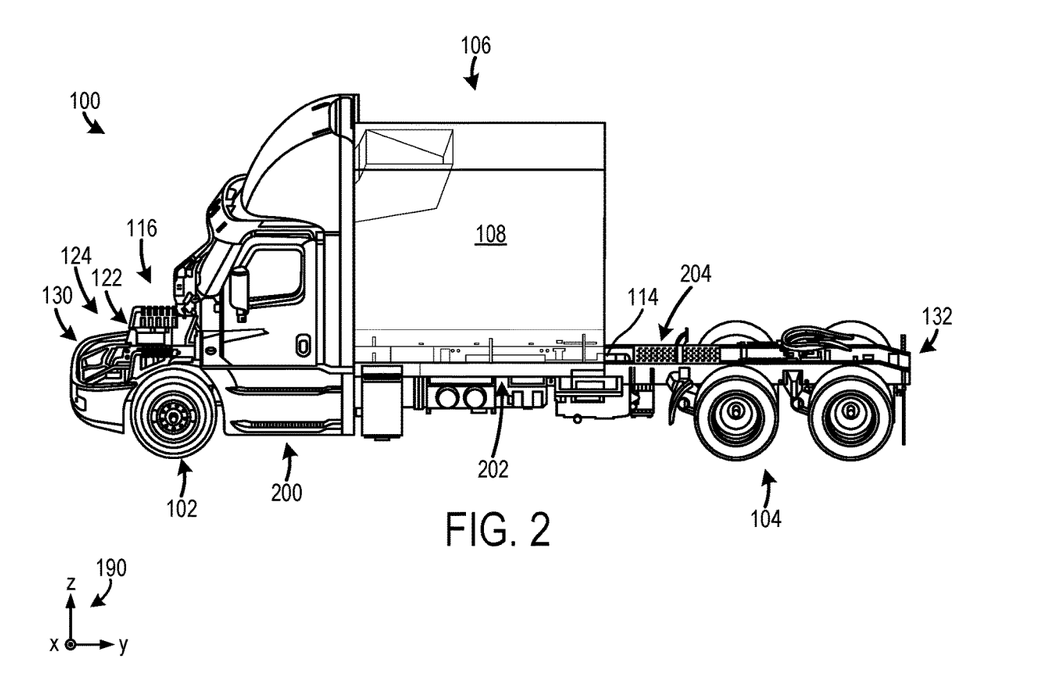
FIG. 2 shows an illustration of the EV, depicted in FIG. 1, with exemplary detailed illustrations of the electric propulsion system components.
Figure 3:
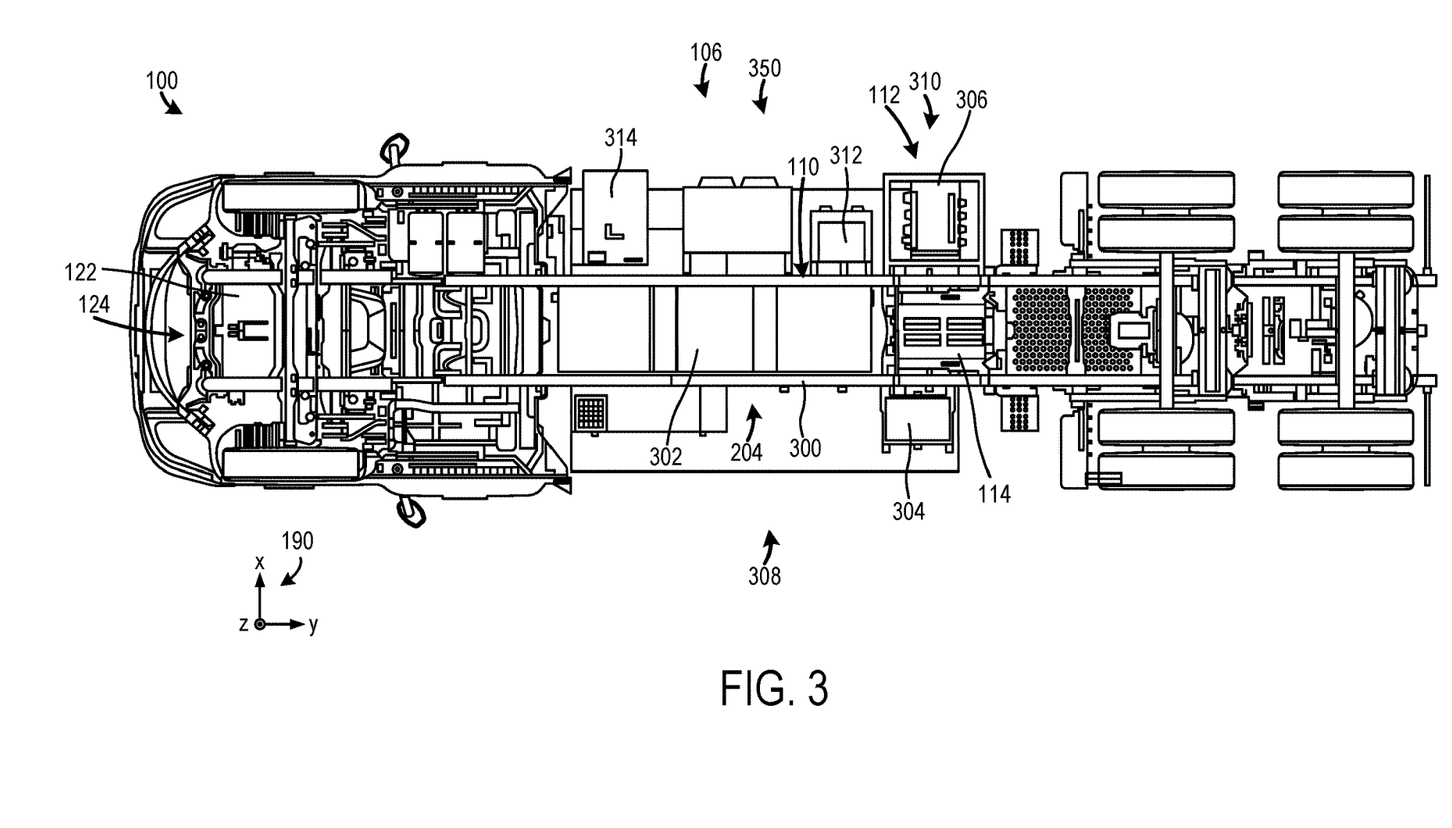
FIG. 3 shows a bottom view of the EV, depicted in FIG. 2.
Figure 4:
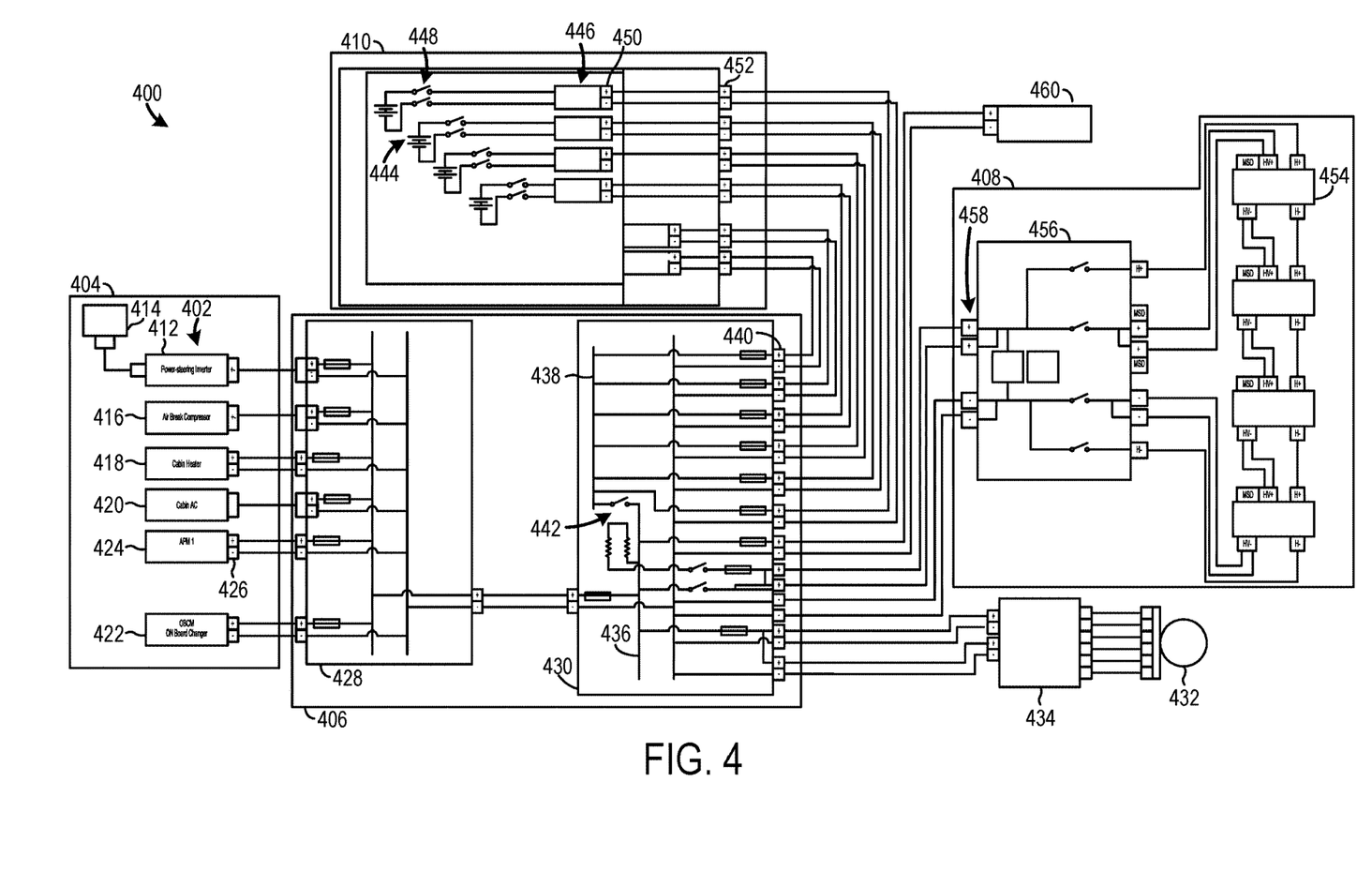
FIG. 4 shows a diagram of an electrical circuit in an EV propulsion system.
Figure 5:
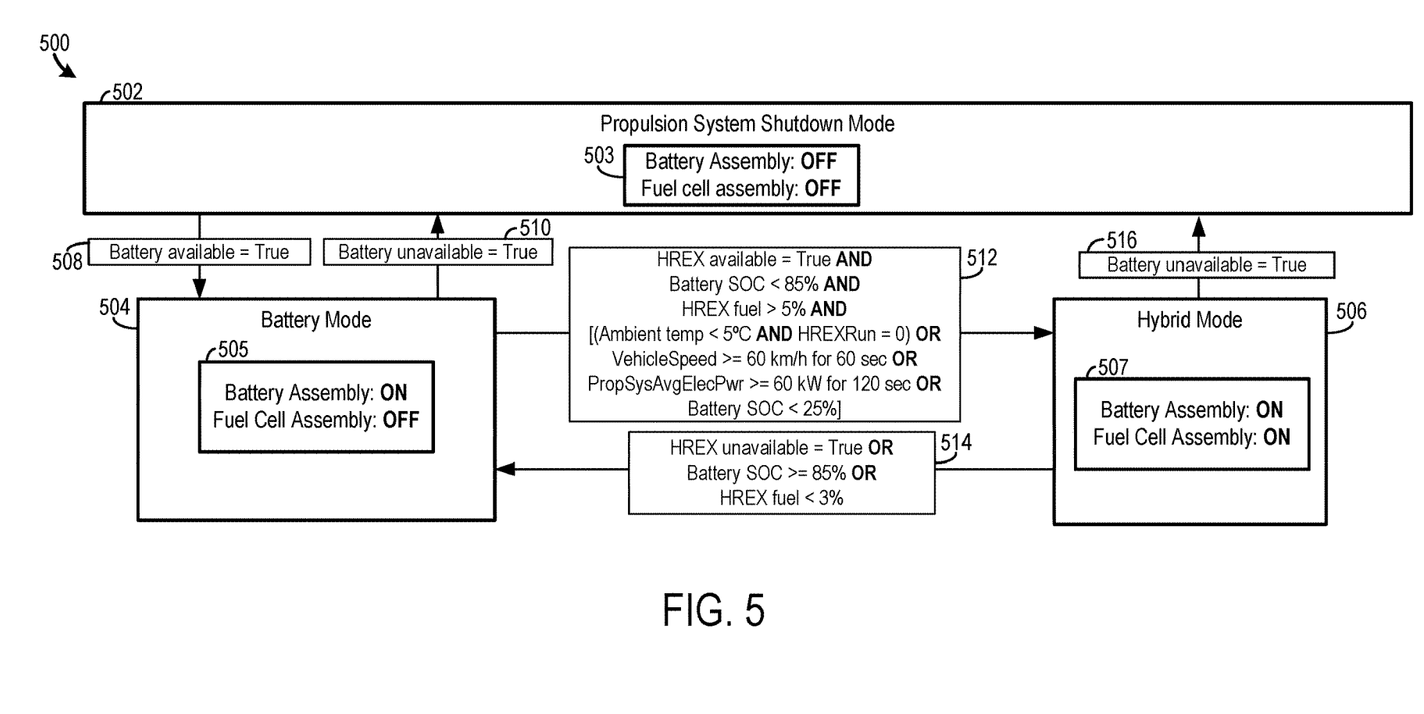
FIG. 5 shows a control diagram for transitioning an EV propulsion system between different operating modes.
Figure 6:
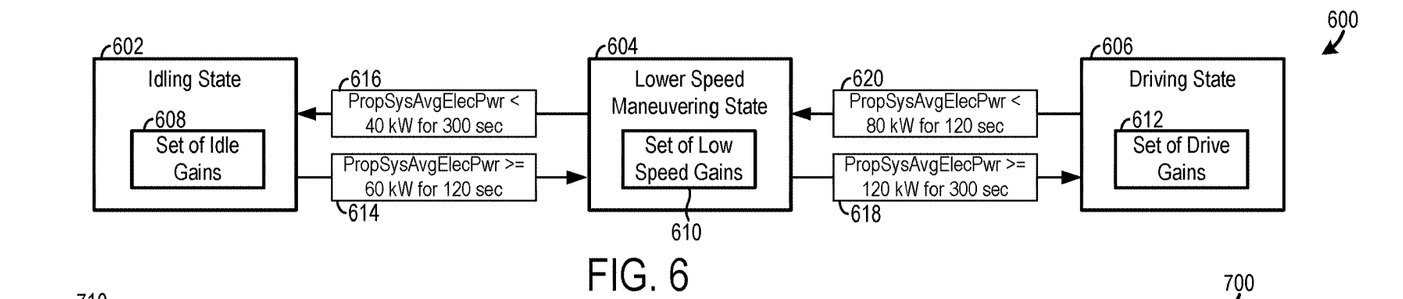
FIG. 6 shows a control diagram for transitioning an EV propulsion system between different states of a hybrid operating mode.
Figure 7:
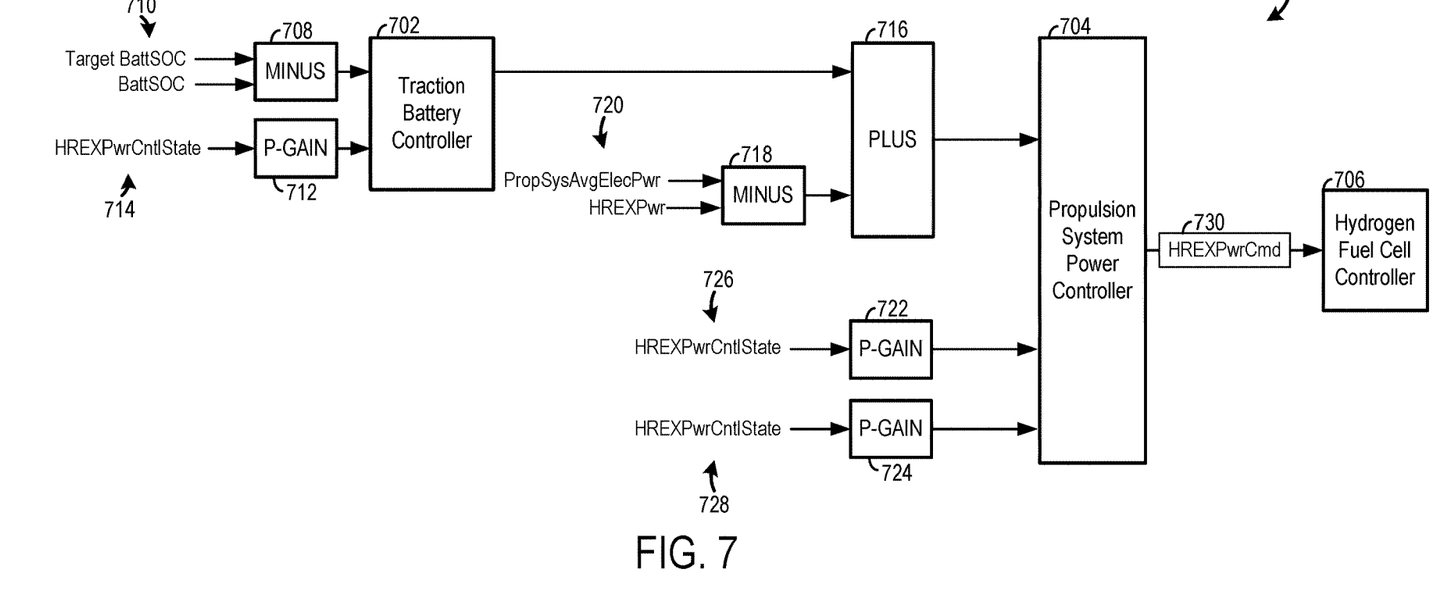
FIG. 7 shows a control diagram with the gains applied to a traction battery controller and a propulsion system controller as well as the relationship between these controllers.

FIG. 1 shows an example of a vehicle designed with modular electric propulsion assemblies. FIG. 2 shows a detailed illustration of the vehicle and electric propulsion assemblies, depicted in FIG. 1. FIG. 3 shows a bottom view of the traction battery assembly and other associated system which are included in the vehicle depicted in FIG. 2. FIG. 4 shows the electronic architecture for electric propulsion assemblies that allows the system to achieve a high level of adaptability. FIGS. 5-6 depict different control diagrams for selecting the propulsion system's operating modes and transitioning between different states of those modes. FIG. 7 shows an exemplary control diagram for feedback controllers and the gains applied to these feedback controllers.

FIG. 1 illustrates an EV 100 with a modular architecture. Specifically, the vehicle may be an all-electric vehicle which does not include an internal combustion engine. The EV 100 is illustrated as a heavy duty vehicle (e.g., a semi-truck) in FIG. 1. A heavy duty vehicle may be classified as any vehicle with a gross vehicle weight rating (GVWR) equal to or greater than 14,969 kilograms (kg). However, in other examples, the vehicle may take a variety of forms such as a light or medium duty vehicle, an on-road or off-road vehicle, and the like. As such, the vehicle may include multiple axles, one of which is a front axle 102 that may be steerable. A rear tandem axle 104 is further depicted in FIG. 1. At least one of the rear axles may be a drive axle, in one example. However, in other examples, numerous axle arrangements in the vehicle have been contemplated. For instance, the vehicle may include a different number of axles and/or axle types.

The EV 100 has different electric propulsion assemblies which have a modular design. These assemblies may be included in EV propulsion system 106. This modular design allows the propulsion system's configuration to be efficiently altered at a later stage in manufacturing than previous electric vehicle designs which have more design rigidity and are therefore less adaptable. Consequently, the vehicle's propulsion system may be efficiently altered at a later stage in manufacturing to more efficiently meet the demands of specific end users. Thus, the configuration of the electric propulsion system may be efficiently tailored to achieve a wider variety of end-use design goals, thereby expanding customer appeal.

The electric propulsion assemblies in the EV 100 may include a hydrogen fuel cell assembly 108 (e.g., a hydrogen range extender (HREX)), a traction battery assembly 110, an electric distribution assembly 112, a traction motor 114 (e.g., motor-generator), and/or an electric accessory assembly 116. Electric energy may be transferred between the hydrogen fuel cell assembly, the traction battery assembly, the electric distribution assembly, the traction motor, and/or the electric accessory assembly based on vehicle operating conditions. For instance, during certain conditions when the traction batteries are below a threshold state of charge, the hydrogen fuel cell assembly may be used to recharge the traction batteries, thereby extending the vehicle's range. Further, electric power may be transferred from the traction batteries to the traction mode during vehicle operation, and in a hybrid mode the fuel cells may be recharging the traction batteries during the electric power transfer between the batteries and the motor. Energy management strategies for the electric propulsion system are expanded upon herein with regard to FIGS. 5-7.

Continuing with FIG. 1, the hydrogen fuel cell assembly 108 and the traction battery assembly 110 are electrically coupled to the electric distribution assembly 112 as denoted via arrows 118, 120, respectively. As such, electrically energy may be transferred between these assemblies. To expound, the hydrogen fuel cell assembly 108 and the traction battery assembly 110 are coupled to the electric distribution assembly 112 in parallel. The electric distribution assembly may include distribution boxes among other components.

Connecting the hydrogen fuel cell assembly and the traction battery assembly to the electric distribution assembly in parallel permits the vehicle to be adapted for use as a hydrogen fuel cell electric vehicle (FCEV), a battery electric vehicle (BEV), or vehicle using both fuel cell and battery systems in tandem. In this way, the vehicle platform may be efficiently tailored for end-use design goals at a later stage in the manufacturing process, if desired. In the case of a vehicle using both fuel cell and battery assemblies, characteristics from both fuel cell and battery electric vehicles may be comingled to mitigate, or in some cases avoid, unwanted compromises between refueling/recharging characteristics and electric drive performance, for instance. For example, when the vehicle includes both the fuel cell and battery systems, the vehicle may use a wider infrastructure network for recharging or refueling. Consequently, the vehicle's applicability, range, and/or efficiency may be increased when both battery and fuel cell systems are incorporated in the vehicle.

The electric distribution assembly 112 is further electrically coupled to the traction motor 114, as denoted by arrows 115. A suitable traction motor may be used such as an alternating current (AC) motor that receives power from an inverter. It will be understood that the traction motor 114 is designed to deliver mechanical power to drive wheels (e.g., drive wheels in the rear drive axle assembly). A transmission, gearbox, and/or other suitable powertrain components may be used to accomplish this power transfer functionality.

The traction battery assembly 110 may include one or more batteries and/or other suitable energy storage devices such as capacitors. The battery assembly 110 may further include a heater and contactors that allow the individual battery packs to be heated and selectively disconnected. The batteries in the traction battery assembly 110 as well as the other batteries described herein may be constructed with a number of suitable chemistries. For instance, the batteries may include lithium ion batteries, lithium ion polymer batteries, nickel-metal hydride batteries, lithium air batteries, combination thereof, and the like.

The EV propulsion system 106 may further include electric accessories 122 which may be positioned in a cradle 124 of the vehicle in front of the cab 126 and are electrically coupled to the electric distribution assembly 112, denoted by arrows 128. These electric accessories 122 may include a power steering inverter, an air brake compressor, a cabin heater, a cabin cooler, a power steering pump, an on-board charger, combinations thereof, and the like.

The hydrogen fuel cell assembly 108 may include multiple hydrogen storage tanks 140 and fuel cells 142 which receive hydrogen from the storage tanks. The fuel cells may be positioned above the storage tanks to enable efficient routing of the hydrogen to the fuel cells as well as fuel cell cooling. Further, the hydrogen fuel cell assembly 108 may be positioned vertically above the traction battery assembly to facilitate efficient installation and removal of each assembly, thereby increasing vehicle modularity.

The vehicle may include a control system 150 with a controller 152. The controller 152 may receive signals from sensors 154 coupled to various regions of the EV 100. For example, the sensors 154 may include wheel speed sensors, battery temperature sensors, battery state of charge (SOC) sensors, battery temperature sensor(s), hydrogen tank pressure sensor(s), an ambient temperature sensor, an accelerator pedal sensor, a brake pedal sensor, fuel cell voltage sensors, and the like.

Upon receiving the signals from the various sensors, the controller processes the received signals, and employs various actuators 156 of vehicle components to adjust the components based on the received signals and instructions stored on the memory of controller. The controller may include a processor 158 and memory 160 that includes various circuits such as microprocessors, memory units, data buses, input-output ports, and the like. As such the memory of the controller may have instructions stored therein that, when executed by the processor, cause the controller to perform various methods and control techniques described herein. The memory may include known data storage mediums such as random access memory, read only memory, keep alive memory, combinations thereof, and the like. An input device 162 (e.g., control pedal(s) such as brake and/or accelerator pedals), a gear selector, an ignition key, combinations thereof, and the like) may further be in electronic communication with the controller 152. The controller 152 and associated control system may be used to control of any of the vehicle systems described herein with regard to FIGS. 2-3. Further, the controller 152 may be designed to implement any of the methods, control strategies, and the like described herein such as the control diagrams shown in FIGS. 5-7.

An axis system 190 is provided in FIG. 1, as well as in FIGS. 2-3, for reference. The z-axis may be a vertical axis (e.g., parallel to a gravitational axis), the x-axis may be lateral axis (e.g., a horizontal axis), and/or the y-axis may be a longitudinal axis, in one example. However, the axes may have other orientations, in other examples. The terms in front and behind denote the relative position of a component along the longitudinal axis or an axis parallel to the y-axis. In this regard, a front side 130 and a rear side 132 of the vehicle are denoted in FIGS. 1 and 2.

FIG. 2 shows a detailed view of the EV 100 with exemplary illustrations of the vehicle system components such as the electric accessories 122 of the electric accessory assembly 116, the hydrogen fuel cell assembly 108, the electric distribution assembly 112, the traction motor 114, and the traction battery assembly 110. As shown, the electric accessories 122 are positioned in the cradle 124 in front of the cab 126. In this way, the accessories may be efficiently incorporated into the vehicle at a location that may impose less space constraints on other vehicle systems. It will be understood, that the cradle 124 may be positioned above the front axle 102.

The hydrogen fuel cell assembly 108 is positioned behind the cab 126 and in front of the tandem axle 104. In this way, the fuel cell assembly may be protected and is positioned in a location that may interfere to a lesser degree with the attachment and/or sizing of a trailer that may be coupled to the vehicle during freight transport.

The traction battery assembly 110 is positioned vertically below the hydrogen fuel cell assembly 108 (e.g., directly below the hydrogen fuel cell assembly and behind the cab). Further, the traction battery assembly 110 may be positioned behind side bars 200, thereby permitting the vehicle operator to more easily enter the cab when compared to electric vehicles that position battery packs directly below the cab. Still further, the traction battery assembly 110 may be incorporated into a section 202 of the chassis 204. Positioning the traction battery assembly 110 into the chassis may allow for increased protection of the batteries from environmental degradation, such as degradation from road debris.

FIG. 3 shows a bottom view of the EV 100. The chassis 204 of the vehicle is again depicted which includes frame rails 300 (e.g., longitudinal rails) between which battery packs 302 in the traction battery assembly 110 are positioned. The traction motor 114 may further be positioned behind the battery packs 302 and between the frame rails 300. A motor inverter 304 and the junction box 306 may be positioned on opposing lateral sides 308, 310 of the chassis 204. A junction box 312 in the electric distribution assembly 112 and/or an air compressor 314 may also be positioned on one lateral side of the chassis. In this way, EV propulsion system 106 may achieve more even weight distribution when compared to vehicles with other battery pack arrangements. The vehicle's handing performance may be consequently increased. FIG. 3 further shows the electric accessories 122 in the cradle 124.

The battery packs 302 and the junction box 312 may be included in an EV battery assembly 350. The battery assembly 350 is designed for efficient installation and removal specifically with regard to the electrically connecting the batteries and associated electronic componentry to the hydrogen fuel cell system and accessories in the front cradle.

The EV propulsion system 106 shown in FIGS. 1-3 is highly adaptable and permits the hydrogen fuel cell assembly to be quickly incorporated into and removed from the vehicle, as desired. In this way, the vehicle may be efficiently altered at a later stage in manufacturing to accommodate for the end-use design targets of the customers. For instance, the vehicle may be efficiently adapted for use as a BEV and/or FCEV.

FIG. 4 shows a circuit diagram of a vehicle system 400. It will be appreciated that the circuit diagram serves as an example of the circuitry in the EV propulsion system 106, depicted in FIGS. 1 and 2. The EV propulsion system 106 shown in FIG. 1 and the vehicle system 400 shown in FIG. 4 may therefore have at least some overlapping components that have a similar function and/or structure. Redundant description of these components is omitted for concision.

The vehicle system 400 may again include electric accessories 402 in an accessory assembly 404, an electric distribution assembly 406, a traction battery assembly 408, and a hydrogen fuel cell assembly 410. The electric accessories 402 may include a power-steering inverter 412 coupled to a power-steering pump 414, an air brake compressor 416, a cabin heater 418, a cabin air conditioning (AC) unit 420, an on board charger 422, an auxiliary power module 424, and/or the like. Each of the accessories include electrical ports 426 that enable connection between the accessories and a front junction box 428 (e.g., a front high voltage distribution box) included in the electric distribution assembly 406. The electric distribution assembly 406 may further include a rear junction box 430 (e.g., a rear high voltage distribution box). In some examples, the high voltage distribution boxes may distribute approximately 24 volts to the components which are electrically coupled thereto. However, other operating voltages have been contemplated.

The front junction box 428 is electrically coupled to the traction battery assembly 408 and the motor 432 and inverter 434 via bus 436 (e.g., a vehicle bus). Another bus 438 (e.g., a fuel cell bus) may be used to electrically couple the rear junction box 430 to the hydrogen fuel cell assembly 410. Each of these connections may be established via ports 440 in the junction box.

A fuel cell assembly contactor 442 may be positioned between the bus 436 and the bus 438 to allow the traction battery assembly 408 and motor 432 to be selectively electrically isolated from the fuel cell assembly 410.

The hydrogen fuel cell assembly 410 may include multiple fuel cells 444 that may be connected to DCDC converters 446 via contactors 448. To elaborate, a contactor may be positioned between each fuel cell and a DCDC bus. The DCDC converters 446 each include connectors 450 that are connected to ports 452 of the hydrogen fuel cell assembly 410. The use of the DCDC converters allows for the use of smaller cabling throughout the vehicle system as opposed to a more centralized solution. The ports 452 are connected to the ports 440 in the junction box associated with the fuel cell bus 438.

The traction battery assembly 408 may include multiple power packs 454, which may be more generally referred to as traction batteries or traction battery units. The power packs may be coupled in parallel and/or series. Further, a distribution box 456 or other suitable electrical arrangement may serve as an electrical interface between ports 458 of the traction battery assembly 408 and the power packs 454.

A battery chiller 460 may further be included in the traction battery assembly 408 or more generally in the vehicle system 400. The battery chiller 460 may be electrically coupled to the vehicle bus 436. The battery chiller 460 is designed to reduce the temperature of the battery packs.

FIG. 5 shows a control diagram 500 for operating an EV propulsion system such as any of the EV propulsion systems described above with regard to FIGS. 1-4. The blocks, mode change logic, controller inputs, and the like shown in FIG. 5 as well as FIGS. 6-7 may be stored as executable instructions in memory of a controller, as previously discussed.

Block 502 indicates a propulsion system shutdown mode where neither the traction battery assembly nor the hydrogen fuel cell assembly are operational and generating electric energy as indicated at 503. The propulsion system may be operated in a shutdown condition while the vehicle is at standstill and there is no operator power request.

Block 504 indicates a battery mode for the propulsion system. In the battery mode, the battery assembly is "ON" and the fuel cell assembly is "OFF," as indicated at 505. ON and OFF states of these assemblies indicate that the assemblies are generating electrical power and inhibited from generating electric power, respectively. Further, in the battery mode electric power may be transferred from the traction battery assembly to a traction motor. In this way, the vehicle is generating electric power for propulsion solely from the battery assembly.

Block 506 indicates a hybrid mode for the propulsion system where both the battery assembly and the fuel cell assembly are on as indicated at 507 and therefore generating electric power. In this way, the hydrogen fuel cells may be turned on when desired to increase vehicle range.

Logic, embedded in arrows, for transitioning between blocks 502, 504, and 506 is illustrated in FIG. 5. In the mode transition logic, numerical values are provided for the propulsion system and vehicle operating conditions. However, these numerical values are use-case examples, and it will be appreciated that the specific numerical values may more broadly represent threshold values which may be altered based on end-use design goals of the propulsion system. As such, the threshold values of the logic parameters may vary based on several factors. However, it will further be understood that these threshold values as well as the other threshold values described herein may generally be non-zero values.

Logic for exiting block 502 and entering block 504 is indicated at 508 where the logic determines if the traction battery assembly is available. For instance, the controller may ascertain that the traction battery assembly has an SOC above a lower threshold value (e.g., 3%, 5%, 6%, etc.) and/or has a responsive controller and responsively transitions from the shutdown mode to the battery mode.

Conversely, logic for exiting block 504 and entering block 502 is indicated at 510 where the logic determines if the traction battery assembly is unavailable. For instance, the traction battery assembly may drop below a threshold value and/or has an unresponsive controller and in response the propulsion assembly may transition from the battery mode to the shutdown mode.

Logic for exiting block 504 and entering block 506 is indicated at 512. The logic indicated at 512 includes determining if the hydrogen fuel cell assembly (e.g., the HREX) is available, determining if the battery state of charge is less than a threshold value (e.g., 85%), determining if the amount of HREX fuel stored in the hydrogen storage tanks is greater than a threshold value (e.g., 5%), and determining if the ambient temperature is less than a threshold value (e.g., 5° C.) and the HREX's run cycle is 0, or determining if the vehicle speed is greater than or equal to a threshold value (e.g., 60 kilometers per hour (km/h)) for a threshold duration (e.g., 60 seconds), or determining if the propulsion system's average electric power output is greater than or equal to a threshold value (e.g., 60 kilowatts (kW)) for a threshold duration (e.g., 120 seconds), or the battery SOC is less than a threshold value (e.g., 25%). If these entry conditions are met, the propulsion system transitions from the battery mode 504 to the hybrid mode 506. However, other entry condition logic for transitioning between the battery mode and the hybrid mode has been contemplated. For instance, the logic for this mode transition as well as the other mode transitions described with regard to FIG. 5 may include a different group of conditions where conditions are removed, replaced and/or added to the sets of entry or exit conditions. It will be appreciated that the operating conditions described with regard to logic 512 as well as the other logic blocks described herein may be ascertained from sensor inputs, modeling, or combinations thereof.

On the other hand, logic for exiting block 506 and entering block 504 is indicated at 514. The logic indicated at 514 includes determining if the HREX is unavailable, determining if the battery SOC is less than a threshold value (e.g., 85%), or the amount of HREX fuel stored in the hydrogen storage tanks is less than a threshold value (e.g., 3%).

Logic for exiting block 506 and entering block 502 is indicated at 516. The logic indicated at 516 includes determining if the traction battery assembly is unavailable. As such, the propulsion system transitions from the hybrid mode 506 to the shutdown mode 502 when the traction battery is unavailable.

FIG. 6 shows a control diagram 600 for transitioning between different states in the hybrid mode 506, depicted in FIG. 5. Continuing with FIG. 6, the control states of the hybrid mode including an idling state 602, a lower speed maneuvering state 604, and a driving state 606 are depicted. In the state transition logic, numerical values are provided for the propulsion system and vehicle operating conditions. However, these numerical values are use-case examples, and it will be appreciated that the specific numerical values may more broadly represent threshold values which may be altered based on end-use design goals of the propulsion system. As such, the threshold values of the logic parameters may vary based on several factors.

The idling state 602, the lower speed maneuvering state 604, and the driving state 606 include associated sets of gains 608, 610, and 612, respectively. These gains may correspond to a traction battery controller and a propulsion system controller, discussed in greater detail herein with regard to FIG. 7. Further, the gains associated with each of the hybrid mode operating states may be selected to maintain the traction battery SOC at a desired percentage or range of percentages as well as reduce the high frequency fluctuations in the hydrogen fuel cell power output. For instance, the gains in the idling and the lower speed maneuvering states may be less aggressive than the driving state. Specifically, in one example, the gains in the idling state may be less than the gains in the low speed maneuvering state and the gains in the low speed maneuvering state may be less than the driving state. As such, the gains may sequentially increase in the idling, low speed maneuvering, and driving states. However, other correspondences between these states may be used, in other examples. Further, it will be understood that the gains are non-zero values.

Logic for transitioning from the idling state 602 to the lower speed maneuvering state 604 is indicated at 614. The logic for this transition may include initiating a transition to the lower speed maneuvering state when the average electrical power generation is greater than or equal to a threshold power (e.g., 60 kW) for a threshold duration (e.g., 120 seconds). Conversely, logic for transitioning from the lower speed maneuvering state 604 to the idling state 602 is indicated at 616. This logic may include initiating a transition to the idling state 602 when the average electrical power generation is greater than or equal to another threshold power (e.g., 40 kW) for another threshold duration (e.g., 300 seconds).

Logic for transitioning from the lower speed maneuvering state 604 to the driving state 606 is indicated at 618. This logic may include initiating a transition to the driving state 606 when the average electrical power generation is greater than or equal to yet another threshold power (e.g., 120 kW) for another threshold duration (e.g., 300 seconds). Conversely, logic for transitioning from the driving state 606 to the lower speed maneuvering state is indicated at 620. This logic may include initiating a transition to the power speed maneuvering state 604 when the average electrical power generation is greater than or equal to yet another threshold power (e.g., 80 kW) for another threshold duration (e.g., 120 seconds).

The control scheme depicted in FIG. 6 may further be designed to adjust the set of gains associated with the system's current operating state (i.e., the idling state, the lower speed maneuvering state, or the driving state) based on an operator power request. For instance, the operator power request may be increased via further depression of an accelerator pedal and in response the gains may be increased and vice versa. In this way, propulsion system performance is enhanced.

The control scheme depicted in FIG. 6 may further be designed to operate the propulsion system in a regeneration state during the hybrid mode. In the regeneration state, the traction motor is generating electrical energy (which may be transferred to the traction batteries) and therefore braking the drivetrain. During this regeneration state, the electric power output of the hydrogen fuel cell assembly may be decreased to allow for an increase in regeneration braking. For instance, the hydrogen fuel cell output may be decreased into an idling set-point or range where the fuel cells are operated to avoid shut-down while producing a small (e.g., minimum) amount of electric power. In this way, fuel cell shutdown is avoided and propulsion system efficiency and range are consequently increased.

FIG. 7 shows another control diagram 700 with a traction battery controller 702, a propulsion system power controller 704 (e.g., a traction battery SOC controller), and a hydrogen fuel cell controller 706. It will be understood that the gains shown in FIG. 7 are examples of the sets of gains depicted in FIG. 6. Continuing with FIG. 7, the controllers 702, 704, and 706 are feedback controllers and the traction battery controller 702 may specifically be a proportional controller (P controller) and the propulsion system controller may specifically be a proportional integral controller (PI controller). Inputs for a subtractive term 708 are indicated at 710 and may include battery SOC and a target battery SOC (e.g., 70%). Input for a gain term 712 is indicated at 714 which includes the hydrogen fuel cell assembly control state term (e.g., the idling state, the lower speed maneuvering state, or the driving state). The subtractive term 708 and gain term 712 are fed into the traction battery controller 702. The output of the traction battery controller 702 is fed into an additive term 716. Inputs for a subtractive term 718 are indicated at 720 and include an average propulsion system power output and a hydrogen fuel cell output. The subtractive term 718 is fed into the additive term 716 and the additive term is then fed into the propulsion system power controller 704. Inputs for gain terms 722 and 724 are indicated at 726 and 728. Input 726 includes a hydrogen fuel cell assembly control state term (e.g., the idling state, the lower speed maneuvering state, or the driving state) and input 728 also includes a hydrogen fuel cell assembly control state term. The gain terms 722 and 724 are then fed into the propulsion system power controller 704. The propulsion system power controller 704 outputs a hydrogen fuel cell assembly power command 730 and sends it to the hydrogen fuel cell controller 706.

Control diagram 700 enables the hydrogen fuel cell assembly's transient behavior to be reduced by strategically using gains associated with the fuel cell assembly's control state to dampen high frequency fluctuations in the fuel cell's power output.

The technical effect of the EV propulsion system operating methods described herein is to decrease the likelihood of fuel cell degradation which stems from transient behavior of the hydrogen fuel cell assembly as well as undesirable cyclical fuel cell shutdown events during vehicle operation, thereby increasing fuel cell longevity.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Elements directly or fixedly coupled to other elements may be referred to as such, in one example.

The invention will be further described in the following paragraphs. In one aspect, a method for operating an electric vehicle (EV) propulsion system is provided that comprises while a traction battery assembly generates electric power, initiating start-up of a hydrogen fuel cell assembly based on a first battery state of charge (SOC) threshold and a first hydrogen fuel storage threshold to transition into a hybrid mode of operation; wherein the traction battery assembly includes one or more traction batteries that are electrically coupled to one or more hydrogen fuel cells in the hydrogen fuel cell assembly via a distribution box; wherein the distribution box is electrically coupled to a traction motor. In one example, the method may further comprise in the hybrid mode of operation, operating the hydrogen fuel cell assembly in an idling state, a lower speed maneuvering state, or a driving state based on a current traction motor power generation and a plurality of propulsion system power ranges corresponding to the idling state, the lower speed maneuvering state, and the driving state. In yet another example, the method may further comprise shutting down of the hydrogen fuel cell assembly based on a second battery SOC threshold or a second hydrogen fuel storage threshold. In another example, the method may further comprise, during a regeneration state, decreasing electric power output of the hydrogen fuel cell assembly.

In another aspect, a propulsion system for an electric vehicle (EV) is provided that comprises a traction battery assembly designed to transfer electric power to a traction motor; and a hydrogen fuel cell assembly designed to transfer electric power to the traction battery assembly; a controller including instructions stored in memory that when executed by the controller, during a hybrid mode, cause the controller to: operate the hydrogen fuel cell assembly in one of an idling state, a lower speed maneuvering state, and a driving state based on a current traction motor power generation and a plurality of power ranges corresponding to the idling state, the lower speed maneuvering state, and the driving state.

In yet another aspect, a method for operating an electric vehicle (EV) system is provided that comprises: subsequent to hydrogen fuel cell assembly start-up, operating the hydrogen fuel cell assembly in an idling state, a lower speed maneuvering state, or a driving state based on a current traction motor power generation and a plurality of power ranges corresponding to the idling state, the lower speed maneuvering state, and the driving state; wherein operating the hydrogen fuel cell assembly in the idling state, the lower speed maneuvering state, or the driving state includes operating a traction battery controller and a propulsion system controller with a distinct set of gains associated with the idling state, the lower speed maneuvering state, or the driving state; and wherein the EV propulsion system includes a traction battery assembly with one or more traction batteries electrically coupled to one or more hydrogen fuel cells.

In one example, the method may further comprise increasing one or more of the gains in the distinct set of gains in response to an increase in an operator power request. In another example, the method may further comprise, while a traction battery assembly is generating electric power, initiating start-up of a hydrogen fuel cell assembly based on a first battery state of charge (SOC) threshold and a first hydrogen fuel storage threshold. In another example, the method may further comprise shutting down of the hydrogen fuel cell assembly based on a second battery SOC threshold or a second hydrogen fuel storage threshold.

In any of the aspects or combinations of the aspects, operating the hydrogen fuel cell assembly in the idling state, the lower speed maneuvering state, or the driving state may include operating a traction battery controller and a propulsion system controller with distinct sets of gains associated with the idling state, the lower speed maneuvering state, and the driving state.

In any of the aspects or combinations of the aspects, controller may further include instructions that when executed, prior to operating the hydrogen fuel cell assembly in one of the states and while the traction battery assembly is generating electric power, cause the controller to: initiate start-up of a hydrogen fuel cell assembly based on a first battery state of charge (SOC) threshold and a first hydrogen fuel storage threshold.

In any of the aspects or combinations of the aspects, initiating start-up of the hydrogen fuel cell assembly may be further based on an ambient temperature, a vehicle speed threshold, and an average electric power generation threshold of the traction battery assembly.

In any of the aspects or combinations of the aspects, the controller may further include instructions that when executed, during a regeneration state and when the battery SOC is less than a threshold value, cause the controller to: decrease the hydrogen fuel cell assembly's power output.

In any of the aspects or combinations of the aspects, the propulsion system may further comprise a distribution box designed to receive electric power from the traction battery assembly and the hydrogen fuel cell assembly and transfer electric power from the traction battery assembly to the traction motor and from the hydrogen fuel cell assembly to the traction battery assembly.

In any of the aspects or combinations of the aspects, the EV may be a heavy duty vehicle.

In any of the aspects or combinations of the aspects, operating the hydrogen fuel cell assembly in the idling state, the lower speed maneuvering state, or the driving state may include operating a traction battery controller and a propulsion system controller with a distinct set of gains associated with the idling state, the lower speed maneuvering state, or the driving state.

In any of the aspects or combinations of the aspects, an output of the traction battery controller may be input into the propulsion system controller.

In any of the aspects or combinations of the aspects, operating the hydrogen fuel cell assembly in the idling state, the lower speed maneuvering state, or the driving state may include adjusting the set of gains associated with the current operating state based on an operator power request.

In any of the aspects or combinations of the aspects, initiating start-up of the hydrogen fuel cell assembly may be further based on an ambient temperature, a vehicle speed threshold, and an average electric power generation threshold of the traction battery assembly.

In another representation, an electric propulsion system energy management method is provided that comprises entering a hybrid drive mode where a hydrogen range extender sub-system and a traction battery sub-system are generating electric power and selecting a hybrid mode state based on the electric propulsion system's power output, and operating the electric propulsion system in the selected state by applying distinct gains to multiple feedback controllers.

Note that the control methods described herein can be used with various vehicle system configurations. At least a portion of the method steps disclosed herein may be stored as executable instructions in non-transitory memory and may be carried out by components, devices, and the like with controllers that include the memory as well as processing units, and the like. Likewise, the order of the method steps is not necessarily required to achieve the features and advantages of the example embodiments described herein, but is provided for ease of illustration and description. One or more of the illustrated actions, operations and/or functions may be repeatedly performed depending on the particular strategy being used.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an electric vehicle (EV) propulsion system, comprising:
while a traction battery assembly is operated to transfer electric power from the traction battery assembly to a traction motor, initiating start-up of a hydrogen fuel cell assembly based on a first state of charge (SOC) threshold that corresponds to the traction battery and a first hydrogen fuel storage threshold to transition into a hybrid mode of operation;
wherein the traction battery assembly includes one or more traction batteries that are electrically coupled to one or more hydrogen fuel cells in the hydrogen fuel cell assembly via a distribution assembly; and
wherein the distribution assembly is electrically coupled to the traction motor.

2. The method of claim 1, further comprising:
in the hybrid mode of operation, operating the hydrogen fuel cell assembly in an idling state, a lower speed maneuvering state, or a driving state based on a current traction motor power generation and a plurality of propulsion system power ranges corresponding to the idling state, the lower speed maneuvering state, and the driving state.

3. The method of claim 2, wherein operating the hydrogen fuel cell assembly in the idling state, the lower speed maneuvering state, or the driving state includes operating a traction battery controller and a propulsion system controller with a distinct set of gains associated with the idling state, the lower speed maneuvering state, or the driving state.

4. The method of claim 3, wherein an output of the traction battery controller is input into the propulsion system controller.

5. The method of claim 3, wherein operating the hydrogen fuel cell assembly in the idling state, the lower speed maneuvering state, or the driving state includes adjusting the set of gains associated with the current operating state based on an operator power request.

6. The method of claim 1, further comprising shutting down of the hydrogen fuel cell assembly based on a second battery SOC threshold or a second hydrogen fuel storage threshold.

7. The method of claim 1, wherein initiating start-up of the hydrogen fuel cell assembly is further based on an ambient temperature, a vehicle speed threshold, and an average electric power generation threshold of the traction battery assembly.

8. The method of claim 1, further comprising during a regeneration state, decreasing electric power output of the hydrogen fuel cell assembly.

9. A propulsion system for an electric vehicle (EV), comprising:
a traction battery assembly electrically coupled to a traction motor via an electric distribution assembly; and
a hydrogen fuel cell assembly electrically coupled to the traction battery assembly via the electric distribution assembly; and
a controller including instructions stored in memory that when executed by the controller, during a hybrid mode, cause the controller to:
operate the hydrogen fuel cell assembly in one of an idling state, a lower speed maneuvering state, and a driving state based on a current traction motor power generation and a plurality of power ranges corresponding to the idling state, the lower speed maneuvering state, and the driving state.

10. The propulsion system of claim 9, wherein operating the hydrogen fuel cell assembly in the idling state, the lower speed maneuvering state, or the driving state includes operating a traction battery controller and a propulsion system controller with distinct sets of gains associated with the idling state, the lower speed maneuvering state, and the driving state.

11. The propulsion system of claim 9, wherein the controller further includes instructions stored in the memory that when executed, prior to operating the hydrogen fuel cell assembly in one of the states and while the traction battery assembly is generating electric power, cause the controller to:

initiate start-up of a hydrogen fuel cell assembly based on a battery state of charge (SOC) threshold and a hydrogen fuel storage threshold.

12. The propulsion system of claim 11, wherein initiating start-up of the hydrogen fuel cell assembly is further based on an ambient temperature, a vehicle speed threshold, and an average electric power generation threshold of the traction battery assembly.

13. The propulsion system of claim 9, wherein the controller further includes instructions stored in memory that when executed, during a regeneration state and when a battery state of charge (SOC) is less than a threshold value, cause the controller to:

decrease the hydrogen fuel cell assembly's power output.

14. The propulsion system of claim 9, further comprising a distribution assembly designed to receive electric power from the traction battery assembly and the hydrogen fuel cell assembly and transfer electric power from the traction battery assembly to the traction motor and from the hydrogen fuel cell assembly to the traction battery assembly.

15. The propulsion system of claim 9, wherein the EV is a heavy duty vehicle.

16. A method for operating an electric vehicle (EV) propulsion system, comprising:

starting-up a hydrogen fuel cell assembly;

subsequent to start-up of the hydrogen fuel cell assembly, operating the hydrogen fuel cell assembly in an idling state, a lower speed maneuvering state, or a driving state based on a current traction motor power generation and a plurality of power ranges corresponding to the idling state, the lower speed maneuvering state, and the driving state;

wherein operating the hydrogen fuel cell assembly in the idling state, the lower speed maneuvering state, or the driving state includes operating a traction battery controller and a propulsion system controller with a distinct set of gains associated with the idling state, the lower speed maneuvering state, or the driving state; and wherein the EV propulsion system includes a traction battery assembly with one or more traction batteries electrically coupled to one or more hydrogen fuel cells.

17. The method of claim 16, further comprising:

increasing one or more of the gains in the distinct set of gains in response to an increase in an operator power request.

18. The method of claim 16, further comprising, while a traction battery assembly is generating electric power, initiating start-up of the hydrogen fuel cell assembly based on a first battery state of charge (SOC) threshold and a first hydrogen fuel storage threshold.

19. The method of claim 18, further comprising shutting down of the hydrogen fuel cell assembly based on a second battery SOC threshold or a second hydrogen fuel storage threshold.

20. The method of claim 18, wherein initiating start-up of the hydrogen fuel cell assembly is further based on an ambient temperature, a vehicle speed threshold, and an average electric power generation threshold of the traction battery assembly.

* * * * *